(12) United States Patent
Verdegan et al.

(10) Patent No.: US 6,378,706 B1
(45) Date of Patent: Apr. 30, 2002

(54) IN-SITU MODULAR CLEANABLE FILTER

(75) Inventors: Barry M. Verdegan, Stoughton; Brian W. Schwandt, Fort Atkinson; Daniel R. Cady, Madison, all of WI (US)

(73) Assignee: Nelson Industries, Inc., Stoughton, WI (US)

( * ) Notice: Subject to any disclaimer, the term of this patent is extended or adjusted under 35 U.S.C. 154(b) by 0 days.

(21) Appl. No.: 09/563,737

(22) Filed: May 3, 2000

(51) Int. Cl.[7] .................. B01D 27/08; B01D 29/62; B01D 29/21
(52) U.S. Cl. .............. 210/411; 210/108; 210/136; 210/135
(58) Field of Search ................ 210/411, 232, 210/108, 798, 136, 135

(56) References Cited

U.S. PATENT DOCUMENTS

| | | | | |
|---|---|---|---|---|
| 1,699,680 A | * | 1/1929 | Sweetland | |
| 1,866,970 A | * | 7/1932 | Garland et al. | |
| 1,895,346 A | * | 1/1933 | Rice | |
| 2,134,385 A | * | 10/1938 | Winlslow | |
| 2,365,766 A | * | 12/1944 | Levier | |
| 3,036,711 A | * | 5/1962 | Wilhelm | |
| 3,333,703 A | * | 8/1967 | Scavuzzo et al. | |
| 3,692,178 A | * | 9/1972 | Reece | |
| 4,643,836 A | * | 2/1987 | Schmid | |
| 4,678,564 A | * | 7/1987 | Moorehead et al. | |
| 5,145,033 A | * | 9/1992 | Bedi et al. | |
| 5,462,679 A | | 10/1995 | Verdegan et al. | |
| 5,779,900 A | | 7/1998 | Holm et al. | |
| 5,858,224 A | | 1/1999 | Schwandt et al. | |

FOREIGN PATENT DOCUMENTS

| | | | |
|---|---|---|---|
| EP | 1008731 A1 | | 6/2000 |
| FR | 2429948 | * | 2/1980 |
| JP | 51-142163 | * | 12/1976 |

* cited by examiner

*Primary Examiner*—Thomas M. Lithgow
(74) *Attorney, Agent, or Firm*—Andrus, Sceales, Starke & Sawall, LLP

(57) ABSTRACT

A filter housing (14) has a first inlet (16) for receiving a first fluid such as oil from a machine such as an internal combustion engine (12), a first outlet (20) returning the first fluid to the machine, a second inlet (24) selectively receiving a second fluid from a source of cleaning fluid (28), and a second outlet (30) exhausting the second fluid. The filter housing has a first flow path therethrough from the first inlet through a filter element (40) in one direction to the first outlet, and a second flow path therethrough from the second inlet then through the filter element in the opposite direction then to the second outlet. The first and second inlets and the first and second outlets are all provided at the same axial end of the housing, for modularity. First and second common flow channels (58 and 68) in the housing each carry the first and second fluids in opposite directions. First and second valves (84 and 86) in the housing enable switching between filtration and cleaning modes.

54 Claims, 2 Drawing Sheets

IN-SITU MODULAR CLEANABLE FILTER

BACKGROUND AND SUMMARY OF THE INVENTION

The invention relates to fluid filters for filtering fluid from a machine, including spin-on type oil filters for internal combustion engines and hydraulic equipment, and more particularly to an in-situ cleanable filter facilitating modularity meeting evolving market demands.

The present invention arose during further development efforts relating to the subject matter of commonly owned U.S. Pat. Nos. 5,462,679, 5,779,900, 5,858,224, and allowed U.S. application Ser. No. 08/755,479, filed Nov. 22, 1996, all incorporated herein by reference. Such subject matter generally relates to cleanable filters, including oil filters, and more particularly to the use of a cleaning fluid, such as pressurized air, to clean the filter at a convenient site relative to the installation of the filter on a machine such as an internal combustion engine.

In prior art cleanable oil filters, it is typical that the oil inlet and outlet are separated from the oil drain and air inlet. The oil inlet and outlet are typically at the top of the filter housing, while the oil drain and air inlet are at the bottom of the filter housing. Separation of the oil inlet and drain reduces potential contamination of upstream oil flow lines by backflushed contaminant. The bottom air inlet ensures that air bubbled through the oil creates a foam prior to reaching the filter media.

Separation of the oil inlet, oil outlet, oil drain and air inlet may not be conducive to certain evolving modular designs using a permanent assembly intended to be part of the engine or equipment. In such modular designs, it is desired that the filter assembly include not only a cleanable and replaceable cartridge filter element, but also associated plumbing. Modular designs bolted onto the engine or equipment are becoming increasingly popular. The present invention addresses and solves this need in a particularly simple and efficient manner.

DETAILED DESCRIPTION OF THE INVENTION

Figure 1:
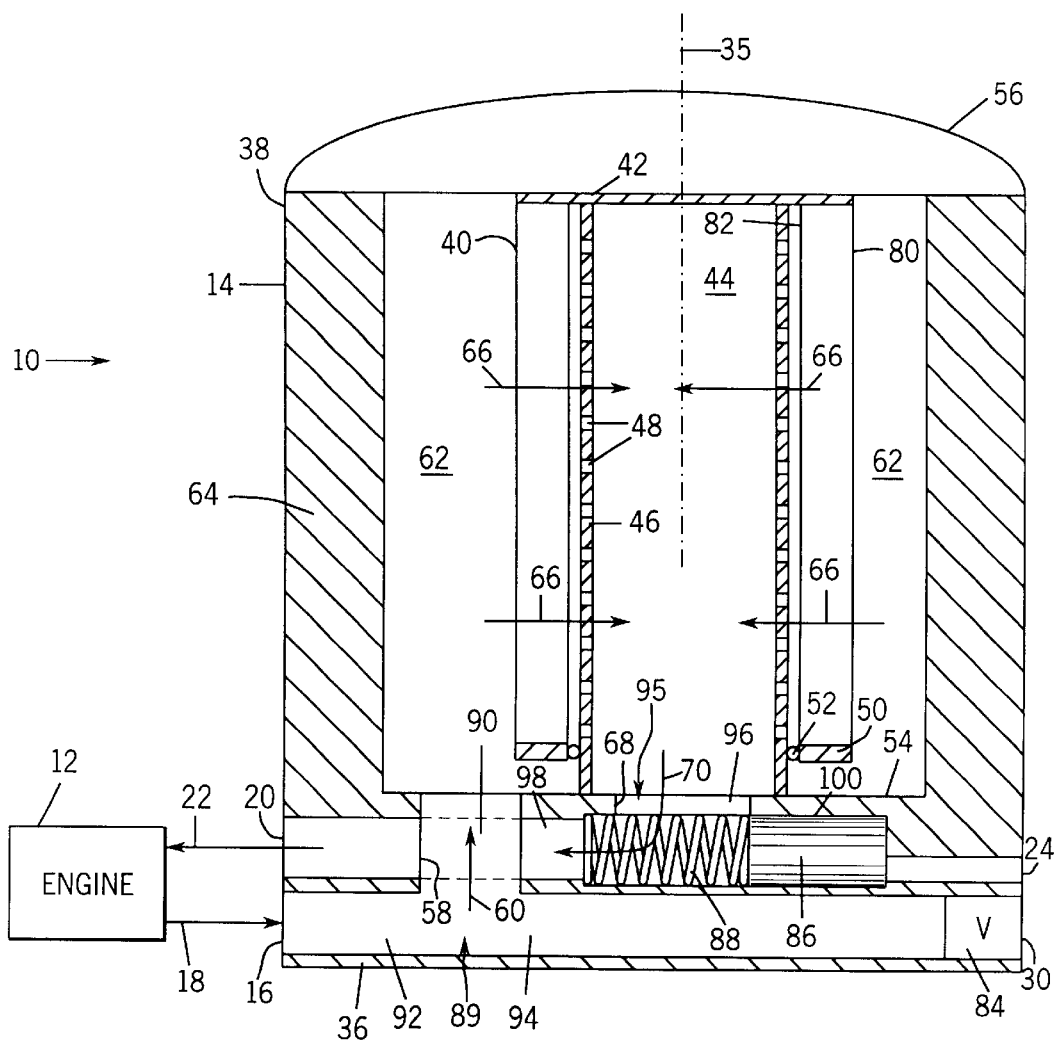
FIG. 1 is a schematic view partially in section showing a filter in accordance with the invention, in the filtration mode.

FIG. 1 shows a filter 10 for filtering fluid from a machine such as internal combustion 12. Filter housing 14 has a first inlet 16 receiving a first fluid such as oil from engine 12 as shown at arrow 18. The housing a first outlet 20 returning the oil to engine 12 as shown at arrow 22. The housing has a second inlet 24, FIG. 2, selectively receiving a second fluid such as pressurized air as shown at arrow 26 from a source of cleaning fluid such as pressurized air source 28. The housing has a second outlet exhausting the cleaning fluid such as air, and the backflushed contaminant and oil as shown at arrow 32 to oil drain collection container 34 for disposal. Housing 14 extends axially along axis 35 between first and second axially distally opposite first and second axial ends 36 and 38. A cleanable and replaceable cartridge filter element 40 extends axially within the housing and is provided by a standard annular pleated element as is known in the art. In the disclosed embodiment, the upper end of filter element 40 is closed by a filter cap 42 extending across the filter element including the hollow interior 44 thereof. A central support tube 46 extends axially upwardly into hollow interior 44 and is perforated as at 48 to permit flow therethrough. The lower end of filter element 40 has an annular end cap 50 sealed to tube 46 by an annular O-ring 52 providing a radially sealing gasket. Alternatively, filter element 40 may extend all the way down to axial surface 54 of the housing and be axially sealed thereagainst by end cap 50, with axial clamping pressure applied by removable end cap 56 which may be clamped, threaded or otherwise attached to housing 14. Further alternatively, tube 46 may be eliminated, or extend only partially upwardly into hollow interior 44 with or without radial seal 52.

Filter housing 14 has a first flow path therethrough, FIG. 1, as shown at arrow 18 from first inlet 16 then through flow channel 58 as shown at arrow 60 into annular space or gap 62 between filter element 40 and axially extending sidewall 64 of the housing then radially inwardly through filter element 40 as shown at arrows 66 into hollow interior 44 then through flow channel 68 as shown at arrow 70 then to first outlet 20 as shown at arrow 22. Filter housing 14 has a second flow path therethrough, FIG. 2, for the pressurized air or cleaning fluid from second inlet 24 as shown at arrow 26 then through flow channel 68 as shown at arrow 72 into hollow interior 44 then radially outwardly through filter element 40 as shown at arrows 74 into annular gap 62 then through flow channel 58 as shown at arrow 76 then to outlet 30 as shown at arrow 78. The noted first and second flow paths have common but opposite direction portions through filter element 40 as shown at arrows 66, FIG. 1, and 74, FIG. 2. The noted first and second flow paths have common but opposite direction portions through first common flow channel 58 as shown at arrows 60, FIG. 1, and 76, FIG. 2. The noted first and second flow paths have common but opposite direction portions through second common flow channel 68 as shown at arrows 70, FIG. 1, and 72, FIG. 2. First common flow channel 58 in housing 14 communicates with first inlet 16 and second outlet 30. Second common flow channel 68 in housing 14 communicates with first outlet 20 and second inlet 24.

Filter element 40 has an upstream dirty side 80 and a downstream clean side 82. The noted first fluid or oil flowing along the noted first flow path flows from upstream dirty side 80 to downstream clean side 82 as shown at arrows 66, FIG. 1. First common flow channel 58 communicates with upstream dirty side 80 of filter element 40 and is between first inlet 16 and second outlet 30. Second common flow channel 68 communicates with downstream clean side 82 of filter element 40 and is between first outlet 20 and second inlet 24.

Figure 2:
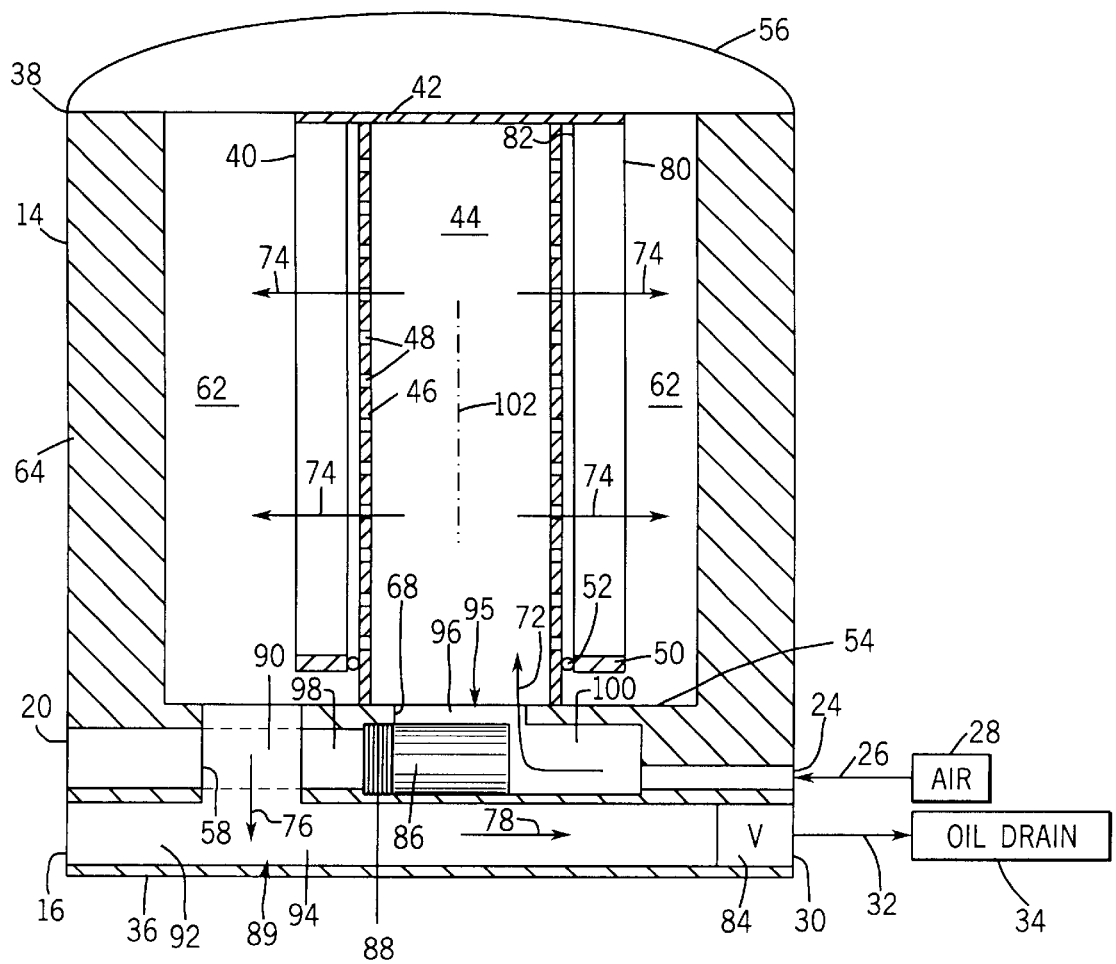
FIG. 2 is like FIG. 1 and shows the filter in the cleaning mode.

A first valve 84 in the housing has a first state, FIG. 1, closing second outlet 30, and has a second state, FIG. 2, opening outlet 30. A second valve 86 in the housing has a first state, FIG. 1, providing communication of downstream clean side 82 of filter element 40 to first outlet 20, as shown at arrow 70. Valve 86 has a second state, FIG. 2, providing communication of second inlet 24 to downstream clean side 82 of filter element 40, as shown at arrow 72. Valve 84 is preferably a petcock or the like externally actuated between open and closed states by the operator. Valve 86 is a plunger biased rightwardly in FIG. 1 by spring 88, and movable leftwardly by air pressure at inlet 24 from air pressure source 28 to overcome spring 88. Valve 86 in the noted first state, FIG. 1, blocks communication between downstream clean side 82 of filter element 40 and second inlet 24. Valve 86 in the noted first state, FIG. 1, blocks communication between first outlet 20 and second inlet 24. Valve 86 in the noted second state, FIG. 2, blocks communication between downstream clean side 82 of filter element 40 and first outlet 20. Valve 86 in the noted second state, FIG. 2, blocks communication between second inlet 24 and first outlet 20. Valve 86 is in second flow channel 68 and is between first outlet 20 and second inlet 24. Valve 84 has been disclosed as an on-off valve, and valve 86 has been disclosed as a three-way valve. Alternatively, valve 84 may be a three-way valve and/or valve 86 may be an on-off valve.

Filter 10 has a filtration mode, FIG. 1, with the first fluid such as oil flowing along the noted first flow path. Filter 10 has a cleaning mode, FIG. 2, with the second fluid such as pressurized air flowing along the noted second flow path. First valve 84 is in its noted closed first state in the filtration mode of the filter, FIG. 1, and the first fluid such as oil flows in a first direction 60 through first common flow channel 58. First valve 84 is in its noted open second state in the cleaning mode of the filter, FIG. 2, and the second fluid such as pressurized air flows in a second direction 76 through first common flow channel 58. Directions 76 and 60 are opposite to each other in flow channel 58. Second valve 86 is in its noted rightward first state in the filtration mode of the filter, FIG. 1, and the first fluid such as oil flows in a first direction 70 through second common flow channel 68. Second valve 86 is in its noted leftward second state in the noted cleaning mode of the filter, FIG. 2, and the second fluid such as pressurized air flows in a second direction 72 through second common flow channel 68. Directions 72 and 70 are opposite to each other through flow channel 68. Second valve 86 blocks communication between second inlet 24 and first outlet 20 in each of its noted first and second states in the filtration and cleaning modes, respectively. Second valve 86 in its noted rightward first state in the filtration mode of the filter, FIG. 1, blocks communication between downstream clean side 82 of filter element 40 and second inlet 24. Second valve 86 in its noted leftward second state in the cleaning mode of the filter, FIG. 2, blocks communication between downstream clean side 82 of filter element 40 and first outlet 20.

As noted above, filter housing 14 extends axially between first and second axially spaced distally opposite ends 36 and 38. Both of the first and second inlets 16 and 24 and both of the first and second outlets 20 and 30 are at first axial end 36 of the housing. As noted above, filter element 40 extends axially in housing 14 and has a hollow interior 44. Second common flow channel 68 is axially aligned with hollow interior 44. As noted above, housing 14 has an axially extending sidewall 64 spaced radially outwardly of filter element 40 by a gap 62. First common flow channel 58 is preferably axially aligned with and axially spaced from gap 62. Cover 56 is provided at second axial end 38 of the housing and is removable therefrom to permit access to and axial removal and replacement of filter element 40. Filter element 40 is an annular member of given outer diameter, and cover 56 has a diameter greater than the outer diameter of filter element 40.

First common flow channel 58 is provided by a junction 89 having an axially extending trunk 90 and first and second laterally extending arms 92 and 94. Trunk 90 communicates with upstream dirty side 80 of filter element 40. First arm 92 communicates with first inlet 16. Second arm 94 communicates with second outlet 30. Second common flow channel 68 is provided by a second junction 95 having an axially extending trunk 96 and first and second laterally extending arms 98 and 100. Trunk 96 communicates with downstream clean side 82 of filter element 40. First arm 98 communicates with first outlet 20. Second arm 100 communicates with second inlet 24. Trunk 96 is preferably along axial centerline 102 of the housing. First valve 84 is preferably in second arm 94 of first junction 89. Second valve 86 is preferably in trunk 96 of second junction 95. Trunk 90 of first junction 89 is laterally spaced from trunk 96 of second junction 95. First and second arms 92 and 94 of first junction 89 are axially spaced from first and second arms 98 and 100 of second junction 95. Trunks 90 and 96 of first and second junctions 89 and 95 extend parallel to each other. First and second arms 92 and 94, and 98 and 100, of first and second junctions 89 and 95 extend in spaced parallel planes. Each of junctions 89 and 95 is disclosed as a T-junction, with respective arms 92 and 94, and 98 and 100, extending distally oppositely from each other, i.e. extending radially outwardly from the axis of its respective trunk 180° apart. Alternatively, other types of junctions may be used, including where the arms extend radially outwardly from a respective trunk at an angle less than 180° therebetween, for example arm 92 of junction 89 may extend leftwardly as shown in FIG. 1, but arm 94 may extend out of the page rather than rightwardly as shown in FIG. 1. Other variations are possible for the noted junctions.

It is recognized that various equivalents, alternatives and modifications are possible within the scope of the appended claims.

What is claimed is:

1. A filter for filtering fluid from a machine, comprising:
  a filter housing having a first inlet receiving a first fluid from said machine, a first outlet returning said first fluid to said machine, a second inlet selectively receiving a second fluid from a source of cleaning fluid, and a second outlet exhausting said second fluid;
  a filter element in said filter housing;
  said filter housing having a first flow path therethrough from said first inlet then through said filter element in one direction then to said first outlet;
  said filter housing having a second flow path therethrough from said second inlet then through said filter element in the opposite direction then to said second outlet, said first and second flow paths having common but opposite direction portions through said filter element;
  said filter housing having a first common flow channel communicating with said first inlet and said second outlet;
  said filter housing having a second common flow channel communicating with said first outlet and said second inlet; said filter element further comprising:
    a first valve in said housing having a first state closing said second outlet, and having a second state opening said second outlet;
    a second valve in said housing having a first state providing communication of said first fluid through said filter element to said first outlet, and having a second state providing communication of said second fluid from said second inlet through said filter element and out to said second outlet.

2. The invention according to claim 1 wherein:
  said filter element has an upstream dirty side and a downstream clean side, wherein said first fluid flowing along said first flow path flows from said upstream dirty side to said downstream clean side;
  said first common flow channel communicates with said upstream dirty side of said filter element and is between said first inlet and said second outlet;
  said second common flow channel communicates with said downstream clean side of said filter element and is between said first outlet and said second inlet.

3. The invention according to claim 1 wherein said first valve and said second valve are independently actuable.

4. The invention according to claim 1 wherein said second valve in said first state blocks communication between said downstream clean side of said filter element and said second inlet.

5. The invention according to claim 4 wherein said second valve in said first state blocks communication between said first outlet and said second inlet.

6. The invention according to claim 1 wherein said second valve in said second state blocks communication between said downstream clean side of said filter element and said first outlet.

7. The invention according to claim 6 wherein said second valve in said second state blocks communication between said second inlet and said first outlet.

8. The invention according to claim 1 wherein said second valve is in said second common flow channel and is between said first outlet and said second inlet.

9. The invention according to claim 1 wherein:

said filter has a filtration mode with said first fluid flowing along said first flow path, and has a cleaning mode with said second fluid flowing along said second flow path;

said first valve is in said first state in said filtration mode, and said first fluid flows in a first direction through said first common flow channel;

said first valve is in said second state in said cleaning mode, and said second fluid flows in a second direction through said first common flow channel, said second direction through said first common flow channel being opposite to said first direction through said first common flow channel;

said second valve is in said first state in said filtration mode, and said first fluid flows in a first direction through said second common flow channel;

said second valve is in said second state in said cleaning mode, and said second fluid flows in a second direction through said second common flow channel, said second direction through said second common flow channel being opposite to said first direction through said second common flow channel.

10. The invention according to claim 9 wherein:

said second valve blocks communication between said second inlet and said first outlet in each of said first and second states in said filtration and cleaning modes, respectively;

said second valve in said first state in said filtration mode blocks communication between said downstream clean side of said filter element and said second inlet;

said second valve in said second state in said cleaning mode blocks communication between said downstream clean side of said filter element and said first outlet.

11. The invention according to claim 1 wherein said filter housing extends axially between first and second axially spaced distally opposite ends, and wherein both of said first and second inlets and both of first and second outlets are at said first end of said housing.

12. The invention according to claim 11 wherein said filter element extends axially in said housing and has a hollow interior, and wherein one of said first and second common flow channels is axially aligned with said hollow interior.

13. The invention according to claim 12 wherein said housing has an axially extending sidewall spaced radially outwardly of said filter element by a gap, and wherein the other of said first and second common flow channels is axially aligned with and axially spaced from said gap.

14. The invention according to claim 11 comprising a cover at said second end of said housing and removable therefrom to permit access to and axial removal and replacement of said filter element.

15. The invention according to claim 14 wherein said filter element is an annular member of given outer diameter, and said cover has a diameter greater than said given outer diameter.

16. The invention according to claim 1 wherein said first fluid is lubricating oil and said second fluid is air.

17. The invention according to claim 1 wherein:

said first valve in said first state blocks communication of said upstream dirty side of said filter element to said second outlet;

said first valve in said second state provides communication of said upstream dirty side of said filter element to said second outlet.

18. The invention according to claim 17 wherein said first valve is an on-off valve.

19. The invention according to claim 17 wherein said second valve is a three-way valve.

20. The invention according to claim 1 wherein said filter housing is cylindrical.

21. The invention according to claim 1 wherein said filter element is cylindrical.

22. The invention according to claim 1 wherein said second valve is automatically actuable by pressure exerted by the entrance of fluid from said second inlet.

23. The invention according to claim 22 wherein said second valve comprises a biasing member which biases said second valve to said first state.

24. A filter for filtering fluid from a machine, comprising:

a filter housing having a first inlet receiving a first fluid from said machine, a first outlet returning said fluid to said machine, a second inlet selectively receiving a second fluid from a source of a cleaning fluid, and a second outlet exhausting said second fluid;

a filter element in said filter housing;

said filter housing having a first flow path therethrough from said first inlet then through said filter element in one direction then to said first outlet;

said filter housing having a second flow path therethrough from said second inlet then through said filter element in the opposite direction then to said second outlet, said first and second flow paths having common but opposite direction portions through said filter element;

said filter housing having a first common flow channel communicating with said first inlet and said second outlet;

said filter housing having a second common flow channel communicating with said first outlet and second inlet;

said filter element having an upstream dirty side and a downstream clean side, wherein said first fluid flowing along said first flow path flows from said upstream dirty side to said downstream clean side;

said first common flow channel communicates with said upstream dirty side of said filter element and is between said first inlet and said second outlet;

said second common flow channel communicates with said downstream clean side of said filter element and is between said first outlet and said second inlet; and wherein said first common flow channel comprises a junction having an axially extending trunk and first and second laterally extending arms, said trunk communicating with said upstream dirty side of said filter element, said first arm communicating with said first inlet, said second arm communicating with said second outlet and;

wherein said junction comprises a T-junction and wherein the arms extend distally oppositely from each other.

25. The invention according to claim 24 wherein said housing has an axial centerline, and said trunk of said junction is along said centerline.

26. A filter for filtering fluid from a machine, comprising:
a filter housing having a first inlet receiving a first fluid from said machine, a first outlet returning said fluid to said machine, a second inlet selectively receiving a second fluid from a source of cleaning fluid, and a second outlet exhausting said second fluid;
a filter element in said filter housing;
said filter housing having a first flow path therethrough from said first inlet then through said filter element in one direction then to said first outlet;
said filter housing having a second flow path therethrough from said second inlet then through said filter element in the opposite direction then to said second outlet, said first and second flow paths having common but opposite direction portions through said filter element;
said filter housing having a first common flow channel communicating with said first inlet and said second outlet;
said filter housing having a second common flow channel communicating with said first outlet and said second inlet;
said filter element having an upstream dirty side and a downstream clean side, wherein the first fluid flowing along said first flow path flows from said upstream dirty side to said downstream clean side;
said first common flow channel communicates with said upstream dirty side of said filter element and is between said first inlet and second outlet;
said second common flow channels communicates with said downstream clean side of said filter element and is between said first outlet and said second inlet;
said first common flow channel comprises a first junction having an axially extending trunk and first and second laterally extending arms, said trunk communicating with said upstream dirty side of said filter element, said first arm communicating with said first inlet, said second arm communicating with said second outlet; and
said second common flow channel comprises a second junction having an axially extending trunk and first and second laterally extending arms, said trunk of said second junction communicating with said downstream clean side of said filter element, said first arm of said second junction communicating with said first outlet, said second arm of said second junction communicating with said second inlet and; said filter housing having a first valve in said second arm of said first junction and a second valve in the trunk of said second junction.

27. The invention according to claim 26 wherein:
said first valve has a first state closing said second outlet, and has a second state opening said second outlet;
said second valve has a first state providing communication of said downstream clean side of said filter element to said first outlet, and has a second state providing communication of said second inlet to said downstream clean side of said filter element;

said second valve in said first state blocks communication between said downstream clean side of said filter element and said second inlet;
said second valve in said first state blocks communication between said first outlet and said second inlet;
said second valve in said second state blocks communication between said downstream clean side of said filter element and said first outlet;
said second valve in said second state blocks communication between said second inlet and said first outlet;
said second valve is in said second common flow channel and is between said first outlet and said second inlet;
said filter has a filtration mode with said first fluid flowing along said first flow path, and has a cleaning mode with said second fluid flowing along said second flow path;
said first valve is in said first state in said filtration mode, and said first fluid flows in a first direction through said first common flow channel;
said first valve is in said second state in said cleaning mode, and said second fluid flows in a second direction through said first common flow channel, said second direction through said first common flow channel being opposite to said first direction through said first common flow channel;
said second valve is in said first state in said filtration mode, and said first fluid flows in a first direction through said second common flow channel;
said second valve is in said second state in said cleaning mode, and said second fluid flows in a second direction through said second common flow channel, said second direction through said second common flow channel being opposite to said first direction through said second common flow channel;
said second valve blocks communication between said second inlet and said first outlet in each of said first and second states in said filtration and cleaning modes, respectively;
said second valve in said first state in said filtration mode blocks communication between said downstream clean side of said filter element and said second inlet;
said second valve in said second state in said cleaning mode blocks communication between said downstream clean side of said filter element and said first outlet;
said first valve and said second valves are independently actuable.

28. The invention according to claim 26 wherein said trunk of said first junction is laterally spaced from said trunk of said second junction.

29. The invention according to claim 26 wherein said first and second arms of said first junction are axially spaced from said first and second arms of said second junction.

30. The invention according to claim 26 wherein said trunks of said first and second junctions extend parallel to each other, and said first and second arms of said first and second junctions extend in spaced parallel planes.

31. A filter for filtering fluid from a machine, comprising:
a filter housing having a first inlet receiving a first fluid from said machine, a first outlet returning said first fluid to said machine, a second inlet selectively receiving a second fluid from a source of cleaning fluid, and a second outlet exhausting said second fluid;
a filter element in said filter housing;
said filter housing having a first flow path therethrough from said first inlet then through said filter element in one direction then to said first outlet;

said filter housing having a second flow path therethrough from said second inlet then through said filter element in the opposite direction then to said second outlet, said first and second flow paths having common but opposite direction portions through said filter element;

said filter housing extending axially between first and second axially spaced distally opposite axial ends;

said filter housing having a first valve and a second valve in said housing;

said first and second valves being independently actuable;

said first and second inlets and said first and second outlets all being at said first axial end of said housing.

32. The invention according to claim 31 wherein said filter has a filtration mode with said first fluid flowing along said first flow path, and has a cleaning mode with said second fluid flowing along said second flow path, and comprising said first and second valves both at said first axial end of said housing and controlling said filter between said filtration and cleaning modes.

33. A filter for filtering fluid from a machine, comprising:
a filter housing having a first inlet receiving a first fluid from said machine, a first outlet returning said first fluid to said machine, a second inlet selectively receiving a second fluid from a source of cleaning fluid, and a second outlet exhausting said second fluid;
a filter element in said filter housing;
said filter housing having a first flow path therethrough from said first inlet then through said filter element in one direction then to said first outlet;
said filter housing having a second flow path therethrough from said second inlet then through said first filter element in the opposite direction then to said second outlet, said first and second flow paths having common but opposite direction portions through said filter element;
said filter housing extending axially between first and second axially spaced distally opposite ends;
said filter element extending axially in said housing and having a hollow interior;
said filter housing having a first valve and a second valve therein;
said filter housing having a common flow channel axially aligned with and extending into said hollow interior of said filter element at said first end of said housing, said common flow channel communicating with a given one of said inlets and also with a given one of said outlets, said filter having a filtration mode with said first fluid flowing in a first direction through said common flow channel, said filter having a cleaning mode with said second fluid flowing in a second direction through said common flow channel, said second direction through said common flow channel being opposite to said first direction through said common flow channel.

34. The invention according to claim 33 wherein said given one of said inlets is at said first end of said housing, and said given one of said outlets is at said first end of said housing.

35. The invention according to claim 33 wherein said first outlet and said second inlet are both at said first end of said housing.

36. The invention according to claim 33 wherein said first inlet and said second outlet are both at said first end of said housing.

37. The invention according to claim 33 wherein both of said first and second inlets and both of said first and second outlets are at said first end of said housing.

38. The invention according to claim 33 wherein said second valve is in said common flow channel and has a first state providing communication between said interior of said filter element and said given one of said outlets and blocking communication between said given one of said inlets and said interior of said filter element, and having a second state providing communication between said given one of said inlets and the interior of said filter element and blocking communication between the interior of said filter element and said given one of said outlets, wherein communication between said given one of said inlets and said given one of said outlets is blocked by said second valve in each of said first and second states.

39. The invention according to claim 33 wherein:
said filter element has an upstream dirty side and a downstream clean side, wherein said first fluid flowing along said first flow path flows from said upstream dirty side to said downstream clean side;
and comprising:
said first valve having a first state closing said second outlet, and having a second state opening said second outlet;
said second valve having a first state providing communication of said downstream clean side of said filter element to said first outlet, and having a second state providing communication of said second inlet to said downstream clean side of said filter element.

40. The invention according to claim 19 wherein:
said second valve in said first state blocks communication between said downstream clean side of said filter element and said second inlet;
said second valve in said first state blocks communication between said first outlet and said second inlet;
said second valve in said second state blocks communication between said downstream clean side of said filter element and said first outlet.

41. The invention according to claim 40 wherein said downstream clean side of said filter element is at said hollow interior thereof, and said second valve is in said common flow channel and is between said first outlet and said second inlet.

42. The invention according to claim 41 wherein said second valve in said second state blocks communication between said second inlet and said first outlet.

43. The invention according to claim 39 wherein:
said filter has said filtration mode with said first fluid flowing along said first flow path, and has said cleaning mode with said second fluid flowing along said second flow path;
said first valve is in said first state in said filtration mode;
said first valve is in said second state in said cleaning mode;
said second valve is in said first state in said filtration mode, and said first fluid flows in said first direction through said common flow channel;
said second valve is in said second state in said cleaning mode, and said second fluid flows in said second direction through said common flow channel.

44. The invention according to claim 43 wherein:
said second valve blocks communication between said second inlet and said first outlet in each of said first and second states in said filtration and cleaning modes, respectively;
said second valve in said first state in said filtration mode blocks communication between said downstream clean side of said filter element and said second inlet;

said second valve in said second state in said cleaning mode blocks communication between said downstream clean side of said filter element and said first outlet.

45. The invention according to claim 39 wherein:

said first valve in said first state blocks communication of said upstream dirty side of said filter element to said second outlet;

said first valve in said second state provides communication of said upstream dirty side of said filter element to said second outlet.

46. The invention according to claim 45 wherein said first valve is an on-off valve.

47. The invention according to claim 45 wherein said second valve is a three-way valve.

48. The invention according to claim 33 wherein said filter housing is cylindrical.

49. A filter for filtering fluid from a machine, comprising:

a filter housing having a first inlet receiving a first fluid from said machine, a first outlet returning said first fluid to said machine, a second inlet selectively receiving a second fluid from a source of cleaning fluid, and a second outlet exhausting said second fluid;

a filter element in said filter housing;

said filter housing having a first flow path therethrough from said first inlet then through said filter element in one direction then to said first outlet;

said filter housing having a second flow path therethrough from said second inlet then through said filter element in the opposite direction then to said second outlet, said first and second flow paths having common but opposite direction portions through said filter element;

said filter element having an upstream dirty side and a downstream clean side, wherein said first fluid flowing along said first flow path flows from said upstream dirty side to said downstream clean side;

said filter further comprising:

a first valve having a first state closing said second outlet, and having a second state opening said second outlet;

a second valve having a first state providing communication of said downstream clean side of said filter element to said first outlet, and having a second state providing communication of said second inlet to said downstream clean side of said filter element; and wherein:

said second valve in said first state blocks communication between said downstream clean side of said filter and said second inlet;

said second valve in said first state blocks communication between said first outlet and second inlet;

said second valve in said second state blocks communication between said downstream clean side of said filter element and said first outlet;

said second valve in said second state blocks communication between said second inlet and said first outlet;

said filter has a filtration mode with said first fluid flowing along said first flow path, and has a cleaning mode with said second fluid flowing along said second flow path;

said first valve is in said first state in said filtration mode;

said first valve is in said second state in said cleaning mode;

said second valve is in said first state in said filtration mode;

said second valve is in said second state in said cleaning mode;

said second valve blocks communication between said second inlet and said first outlet in each of said first and second states in said filtration and cleaning modes, respectively;

said second valve in said first state in said filtration blocks communication between said downstream clean side of said filter element and said second inlet;

said second valve in said second state in said cleaning mode blocks communication between said downstream clean side of said filter element and said first outlet.

50. The invention according to claim 49 wherein said first valve and said second valve are independently actuable.

51. The invention according to claim 49 wherein said second valve is automatically actuable by pressure exerted by the entrance of fluid from said second inlet.

52. The invention according to claim 49 wherein said second valve comprises a biasing member which biases said second valve to said first state.

53. The invention according to claim 49 wherein said first valve is in said filter housing.

54. The invention according to claim 49 wherein said second valve is in said filter housing.

* * * * *